(12) United States Patent
Sanford et al.

(10) Patent No.: US 11,391,279 B1
(45) Date of Patent: Jul. 19, 2022

(54) COMPRESSOR VALVE ASSEMBLY WITH REMOVABLY AFFIXED GUIDE IN A RECIPROCATING COMPRESSOR

(71) Applicant: DRESSER-RAND COMPANY, Houston, TX (US)

(72) Inventors: Joel T. Sanford, Bath, NY (US); Edward Frazzini, Corning, NY (US)

(73) Assignee: DRESSER-RAND COMPANY, Houston, TX (US)

( * ) Notice: Subject to any disclaimer, the term of this patent is extended or adjusted under 35 U.S.C. 154(b) by 0 days.

(21) Appl. No.: 17/229,984

(22) Filed: Apr. 14, 2021

(51) Int. Cl.
*F04B 49/22* (2006.01)
*F16K 15/02* (2006.01)
*F16K 27/00* (2006.01)

(52) U.S. Cl.
CPC ............ *F04B 49/22* (2013.01); *F16K 15/026* (2013.01); *F16K 27/003* (2013.01)

(58) Field of Classification Search
CPC .. F04B 49/22; F04B 39/1013; F04B 39/1066; F16K 15/026; Y10T 137/7839
See application file for complete search history.

(56) References Cited

U.S. PATENT DOCUMENTS

| | | | | |
|---|---|---|---|---|
| 4,872,481 A * | 10/1989 | Shaw | ............... | F04B 53/1087 137/543.13 |
| 9,309,978 B2 | 4/2016 | Hatch et al. | | |
| 2001/0039966 A1 * | 11/2001 | Walpole | ............. | F04B 39/1053 137/512.1 |
| 2009/0179170 A1 * | 7/2009 | Bassett | ............... | F04B 53/1032 251/318 |
| 2010/0090149 A1 * | 4/2010 | Thompson | .......... | F04B 39/1013 251/359 |
| 2011/0070113 A1 * | 3/2011 | Mohamed | .............. | H02K 35/02 417/505 |
| 2015/0204319 A1 * | 7/2015 | Columpsi | ............. | F16K 15/026 417/559 |
| 2015/0252909 A1 * | 9/2015 | Hatch | .................. | F04B 39/1053 137/538 |
| 2018/0298890 A1 * | 10/2018 | Schulz | .................... | F04D 17/08 |
| 2018/0306176 A1 * | 10/2018 | Schulz | .................. | F16K 15/026 |
| 2019/0195214 A1 * | 6/2019 | Hatch | ................. | F04B 53/1025 |
| 2022/0065358 A1 * | 3/2022 | Schulz | ................ | F04B 39/1053 |

FOREIGN PATENT DOCUMENTS

WO  2020226657 A1  11/2020

OTHER PUBLICATIONS

PCT International Search Report and Written Opinion dated May 11, 2022 corresponding to PCT Application No. PCT/US2022/018846 filed Mar. 4, 2022.

* cited by examiner

*Primary Examiner* — Reinaldo Sanchez-Medina
*Assistant Examiner* — Nicole Gardner

(57) ABSTRACT

A compressor valve assembly is disclosed. The valve assembly includes a guide having a cylindrical cup portion and a cylindrical stem portion that extends axially in a socket where the guide can be removably affixed to a stop plate. The disclosed valve assembly is conducive to user-friendly serviceability while realizing an increased flow area with operational capability at relatively higher pressures and practically no susceptibility to bending stresses.

19 Claims, 5 Drawing Sheets

COMPRESSOR VALVE ASSEMBLY WITH REMOVABLY AFFIXED GUIDE IN A RECIPROCATING COMPRESSOR

Disclosed embodiments relate generally to compressor valves, and, more particularly, to a compressor valve assembly for a reciprocating compressor.

BACKGROUND

A reciprocating compressor is a positive displacement compressor. In a reciprocating compressor, a fluid to be compressed enters a chamber via an inlet and exits the chamber through an outlet. The compression is a cyclical process in which the fluid is compressed by a reciprocating movement of a piston head. A plurality of compressor valve assemblies may be arranged around the chamber. The compressor valve assemblies are switched between a close state and an open state due to a pressure difference across the compressor valve assemblies in response to the reciprocating movements of the piston head.

DETAILED DESCRIPTION

Figure 1:
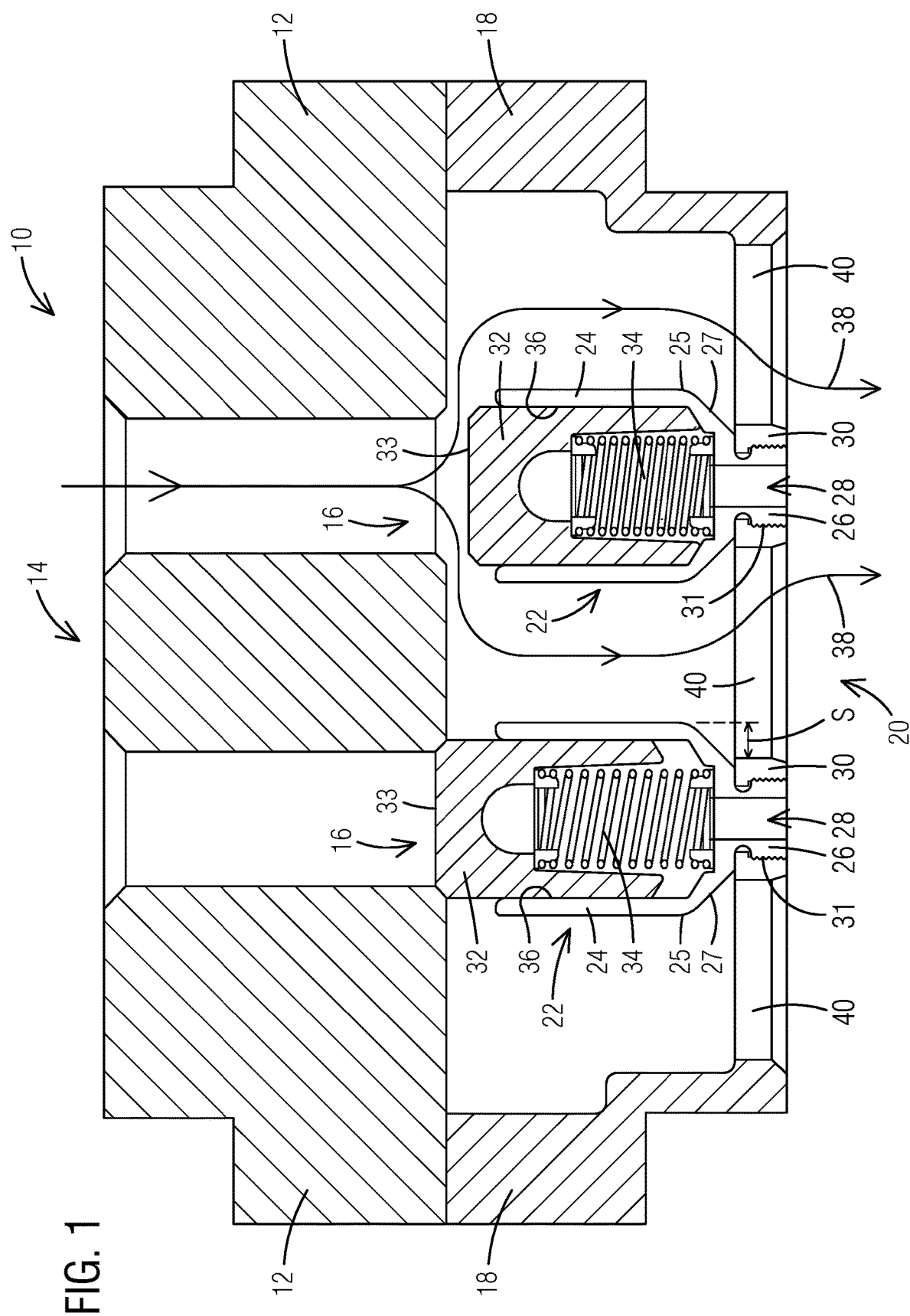
FIG. 1 is a schematic cross-sectional view of a disclosed compressor valve assembly including an embodiment of a guide that can be removably affixed to structures of the compressor valve assembly.

The present inventors have recognized that a given structural design of compressor valve assembly can affect several aspects of the operation of the valve assembly and ultimately the overall operation of the compressor. For example, the configuration of the valve assembly may affect the fluid flow dynamics through the valve assembly, including, for example, seal effectiveness, pressure drop, and operational costs. Fluid flow calculations can, for example, indicate the resistance caused by a fitting and/or component in the valve assembly by way of a dimensionless coefficient K, where a higher K value can indicate higher resistance to fluid flow, which, generally, is not a desirable characteristic in a valve assembly. In addition, the design of the valve assembly may affect its reliability, maintenance frequency, complexity, costs of manufacturing, difficulty of installation and/or serviceability.

For example, certain known valve assembly designs, such as involving a mushroom-style valve head have been used to increase flow area (e.g., resulting in a relatively lower K value). However, the mushroom-style valve head are susceptible to bending stresses and this may reduce broad applicability of such valve assembly designs. By comparison, a bullet-style valve head can be operated at relatively higher pressures and is less susceptible to bending stresses, which improves reliability of the valve assembly. However, the bullet-style valve head tends to reduce the flow area of the valve assembly (e.g., resulting in a relatively higher K value). A hybrid valve head design involving certain aspects of both the bullet-style valve head and the mushroom-style valve head (e.g., colloquially referred to as a hammer-head style) provides a compromise that attempts to resolve the foregoing issues but may fall somewhat short in certain aspects, such as having a somewhat reduced flow area.

At least in view of the foregoing considerations, the present inventors disclose a compressor valve assembly that cost-effectively and reliably incorporates the full benefits of the so-called bullet-style valve head design and effectively increases the flow area. Additionally, the disclosed compressor valve assembly effectively permits the guide to be removably affixed to the stop plate and hence the disclosed design is conducive to user-friendly serviceability of individual guides while realizing an increased flow area with the full benefits of a bullet-style valve head.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may.

It is noted that disclosed embodiments need not be construed as mutually exclusive embodiments, since aspects of such disclosed embodiments may be appropriately combined by one skilled in the art depending on the needs of a given application.

FIG. 1 is a cross-sectional view of a disclosed compressor valve assembly 10 including a seat 12 disposed at an inlet side 14 of compressor valve assembly 10. Seat 12 includes a plurality of inlet flow apertures 16. By way of example, FIG. 1 illustrates just two such inlet flow apertures 16, with typical seats 12 having any number of inlet flow apertures 16 that may be desired for a given application.

FIG. 1 further illustrates a stop plate 18 disposed at an outlet side 20 of compressor valve assembly 10. Stop plate 18 is in abutting relationship against seat 12. Stop plate 18 includes a plurality of guides 22 that can each be removably affixed to stop plate 18. By way of example, FIG. 1 illustrates just two such guides 22.

Figure 5:
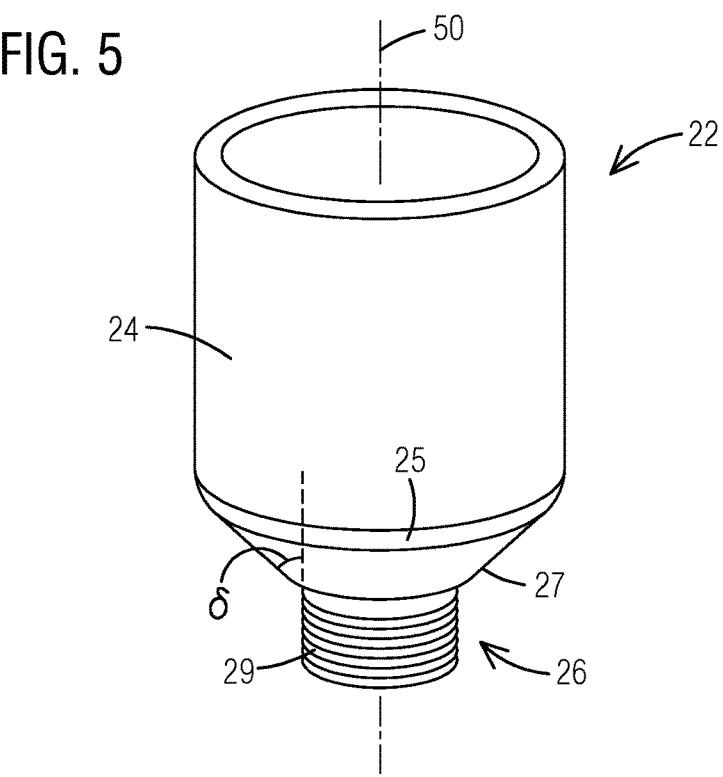
FIG. 5 is an isometric view of an embodiment of the guide illustrating structural details of certain portions of the guide.

Each guide 22 has a cylindrical cup portion 24 and a cylindrical stem portion 26 that extends axially in a socket 28 defined by a cylindrical wall 30 in stop plate 18. In one non-limiting embodiment, a base perimeter 25 of the cylindrical cup portion is spaced apart relative to the bottom of stop plate 18. In one non-limiting embodiment, guide 22 further includes a conical transition 27 disposed between the base perimeter 25 of cylindrical cup 24 and cylindrical stem portion 26. In one non-limiting embodiment, an inner surface 31 of cylindrical wall 30 has a thread configured to provide a threaded connection with a threaded mating surface 29 (FIG. 5) of cylindrical stem portion 26. At least some of the foregoing structural portions of guide 22 may be better appreciated in the isolated isometric view of guide 22 shown in FIG. 5.

In one embodiment, conical transition 27 defines a taper angle δ (FIG. 5), such as may defined relative to a line parallel to the longitudinal axis 50 of the guide. In one non-limiting embodiment, the taper angle may have a range from 25 degrees to 65 degrees. In another non-limiting embodiment, the taper angle may have a range from 30 degrees to 60 degrees. In still another non-limiting embodiment, the taper angle may have a range 35 degrees to 55 degrees. It will be appreciated that disclosed embodiments need not include conical transition 27.

Returning to FIG. 1, in one non-limiting embodiment, a seal element 32 and a spring 34 are disposed in cylindrical cup portion 24. An inner surface 36 of cylindrical cup portion 24 is configured to guide travel of seal element 32 along the inner surface 36 of cylindrical cup portion 24 so that a seal head 33 of seal element 32 moves to close inlet flow aperture 16 when spring 34 is uncompressed and moves away from inlet flow aperture 16 when spring 34 is compressed during operation of the compressor valve assembly. This latter condition allows a flow of working fluid to pass from inlet side 14 of compressor valve assembly 10 to outlet side 20 of compressor valve assembly 10 and this is schematically represented by lines 38 with arrow-heads.

Without limitation, seal head 33 may have a streamlined configuration. That is, seal head 33 belongs to the category of seal heads described above as involving the bullet-style valve head, and therefore seal head 33 provides all the benefits noted above in connection with a bullet-style valve head. Non-limiting example of such benefits include operational capability at relatively higher pressures and less susceptibility to bending stresses.

In one non-limiting embodiment, a group of outlet flow apertures 40 is disposed in stop plate 18. The group of outlet flow apertures 40 is arranged about cylindrical stem portion 26. By way of example, FIG. 1 illustrates two such outlet flow apertures 40 about each of the cylindrical stem portions 26 shown in FIG. 1. In one non-limiting embodiment, a segment (s) of respective cross sections of the group of outlet flow apertures 40 is spanned by cylindrical cup 24 and in one non-limiting embodiment segment (s) extends up to a point circumscribed by the outer surface of cylindrical wall 30.

Figure 6:
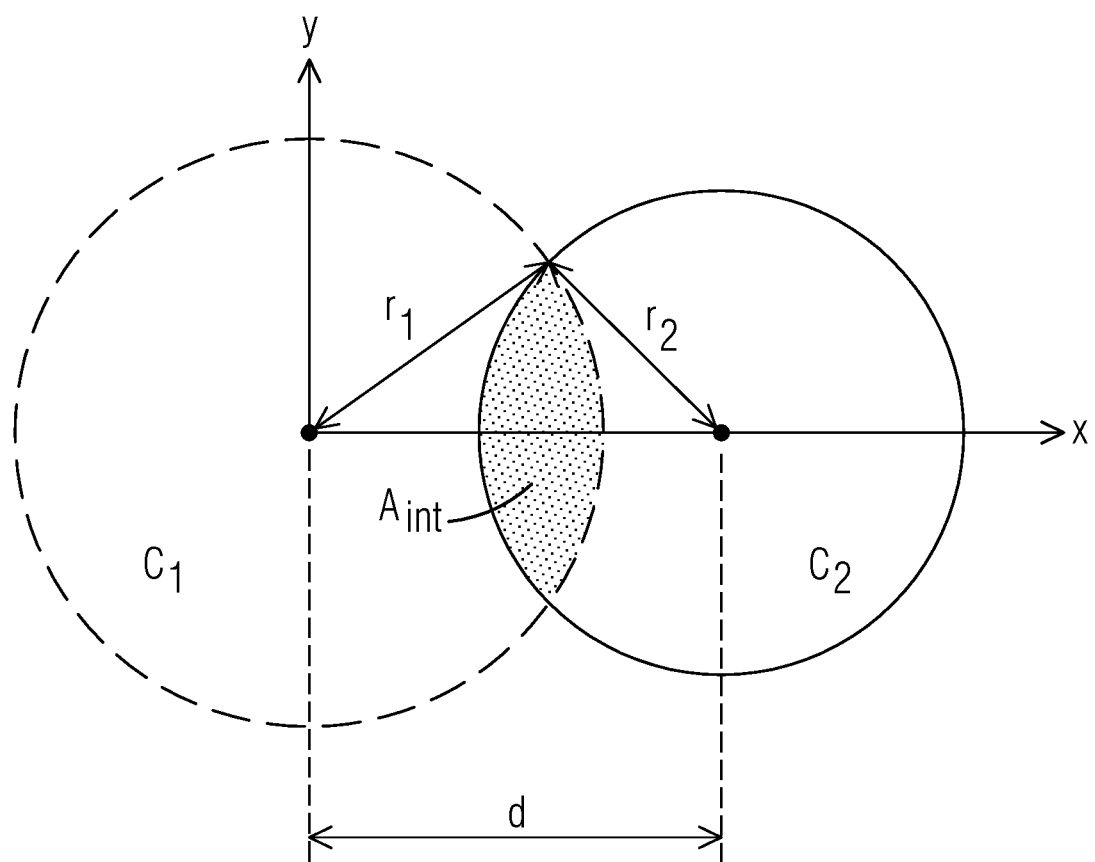
FIG. 6 is graph useful to conceptualize an increased outlet flow area that can be effectively realized by disclosed compressor valve assemblies.

In one non-limiting embodiment, each segment (s) of the respective cross sections of the group of outlet flow apertures 40 has an outlet flow area defined by a partial intersection of a circle (for example circle $C_2$ in FIG. 6) having a radius ($r_2$) formed by a respective outlet flow aperture 40 and a circle (for example circle $C_1$ in FIG. 6) having a radius ($r_1$) formed by base perimeter 25 of cylindrical cup 24. (To further facilitate understanding, radii ($r_1$) and ($r_2$) are also labeled in FIG. 3). These circles have respective center points at a distance (d) from one another, (for example, this distance d is labelled in FIGS. 3 and 6). It will be appreciated that the radius ($r_2$) of the respective outlet flow aperture 40 is smaller relative to the radius ($r_1$) of the base perimeter of the cylindrical cup. Since the outlet flow apertures 40 and base perimeter 25 of cylindrical cup 24 are on different planes (e.g., axially spaced-apart from one another) it will be further appreciated that circle $C_1$ represents a projection onto circle $C_2$. This is schematically represented by illustrating circle $C_1$ with a dashed line.

Figure 2:
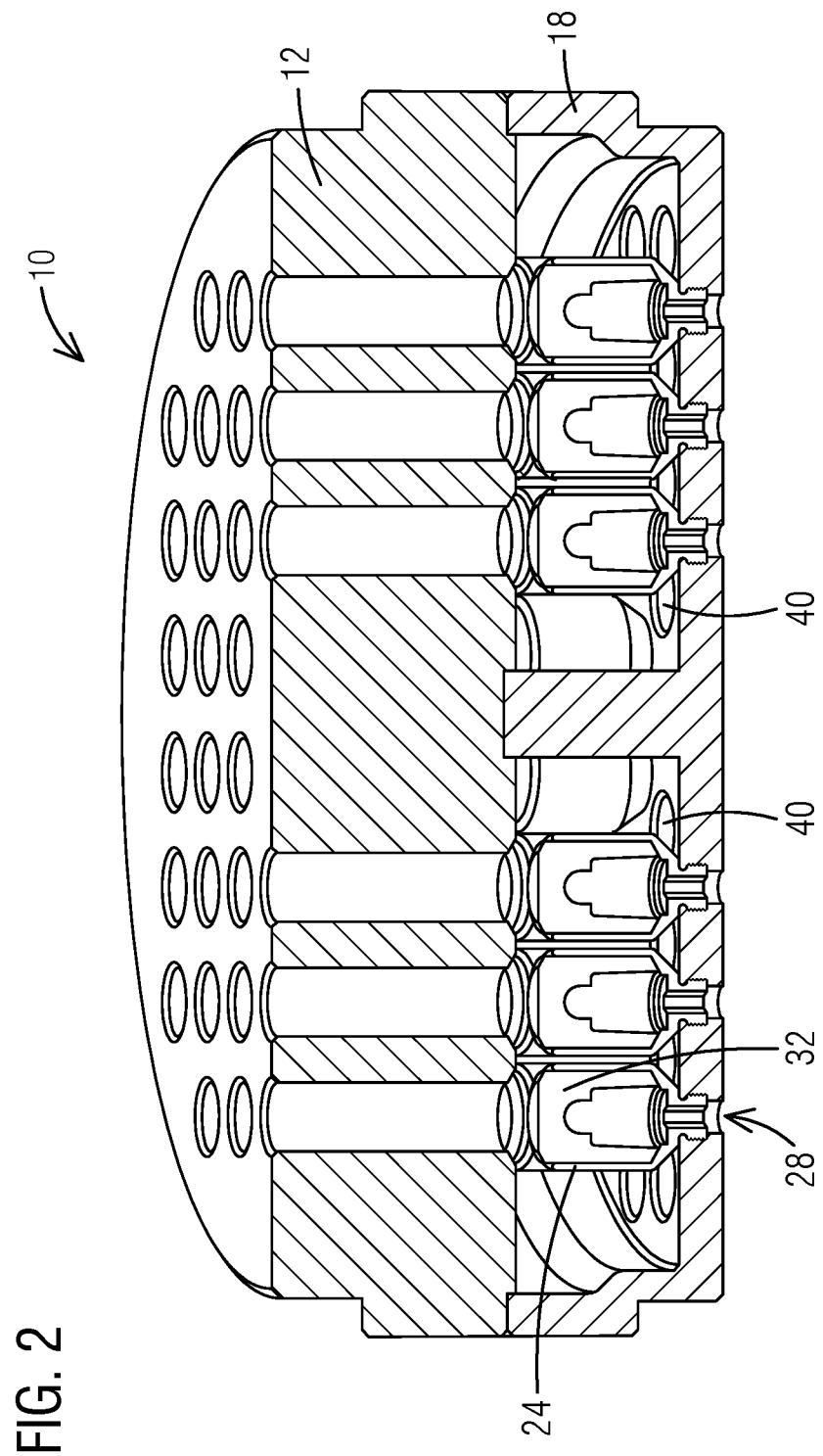
FIG. 2 is a fragmentary isometric view of the disclosed compressor valve assembly including a cross-sectional view along a cutting plane defined by line 2-2 in FIG. 4.
Figure 3:
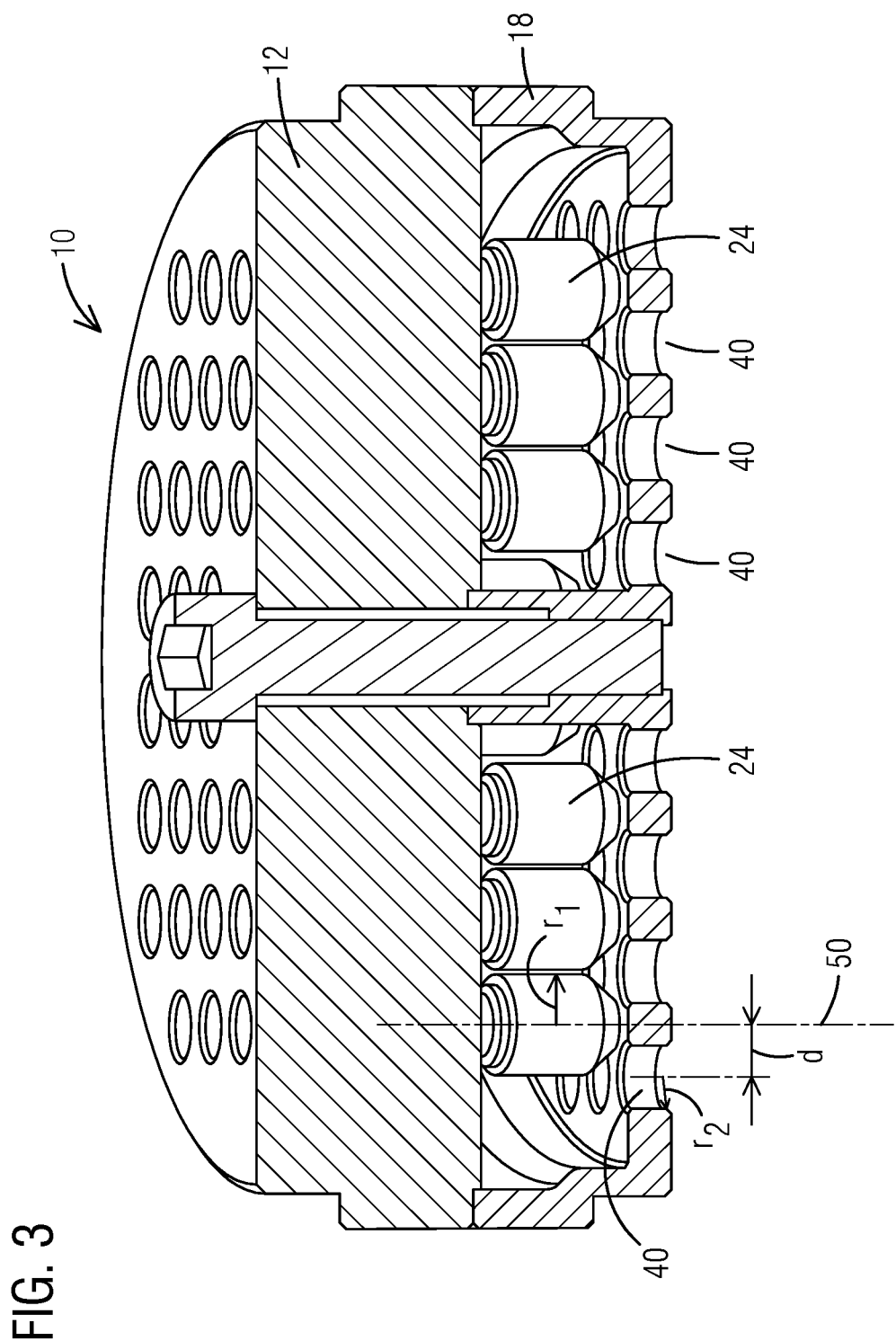
FIG. 3 is a fragmentary isometric view of the disclosed compressor valve assembly including a cross-sectional view along a cutting plane defined by line 3-3 in FIG. 4.
Figure 4:
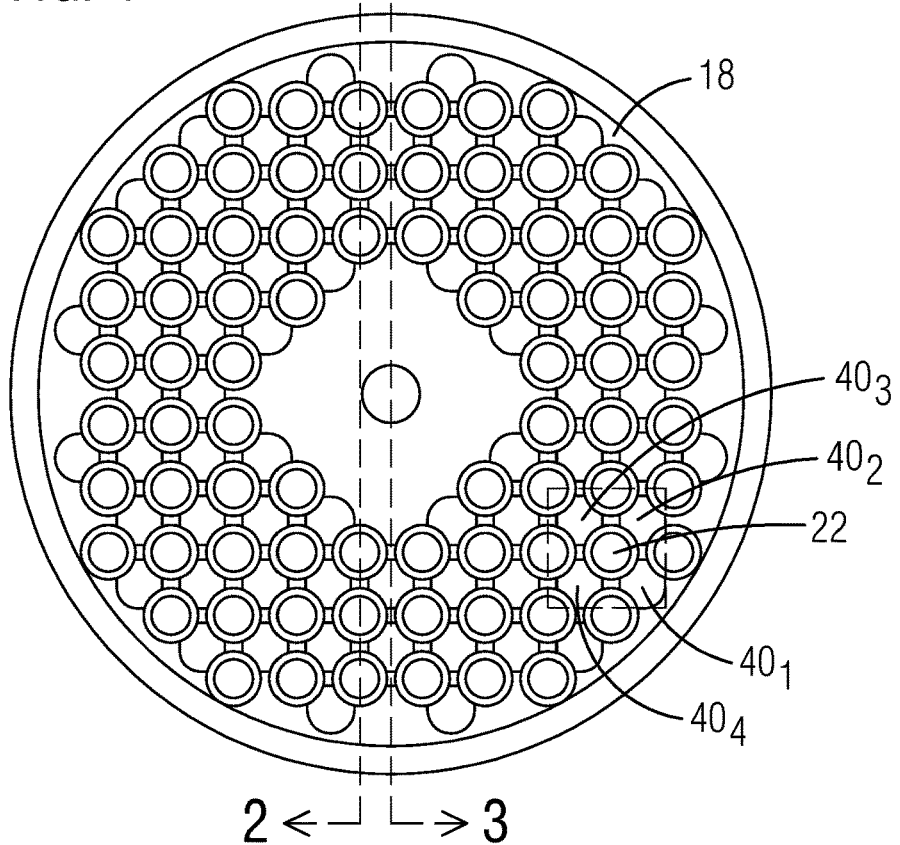
FIG. 4 is a top view of disclosed compressor valve assemblies as may be arranged throughout a stop plate.

FIG. 2 is a fragmentary isometric view of the disclosed compressor valve assembly 10 including a cross-sectional view along a cutting plane defined by line 2-2 in FIG. 4 and together with the isometric shown in FIG. 3 these views should allow to better visually appreciate at least the structural details of compressor valve assembly 10 that have been described above.

As may be appreciated in FIG. 4, in one non-limiting embodiment, the group of outlet flow apertures—about the cylindrical stem portion of any given guide 22—may be formed by four outlet flow apertures ($40_1$ through $40_4$) arranged in a square centered about the longitudinal axis of the guide 22. It will be understood that aspects of disclosed embodiment are not limited either to a group of four outlet flow apertures about the cylindrical stem portion of any given guide 22 or to a square arrangement. It will be appreciated that the outlet flow apertures through the stop plate 18 can be placed relative closer to the respective longitudinal axes (e.g., the respective center lines) of each neighboring guide 22. This allows an increased quantity of guides and associated valve elements to be installed and a corresponding increased quantity of flow holes to be used for given size of valve assembly diameter. In one non-limiting example, without limitation, this results in an increase in valve flow area of approximately 33% compared to a prior similarly sized valve.

As noted above, FIG. 6 shows two intersecting circles C1 and C2 of radii r1 and r2 respectively and where the distance between the centers of the circles is d. Circle 2 with radius ($r_2$) is indicative of the respective outlet flow aperture and circle 1 with radius ($r_1$) is indicative of the base perimeter of the cylindrical cup. It can be shown that the intersection area ($A_{int}$) of the circles is defined by the following:

$$A_{int} = r_1^2 \cos^{-1}\left(\frac{d_1}{r_1}\right) - d_1\sqrt{r_1^2 - d_1^2} + r_2^2 \cos^{-1}\left(\frac{d_2}{r_2}\right) - d_2\sqrt{r_2^2 - d_2^2}$$

Where $$d_1 = \frac{r_1^2 - r_2^2 + d^2}{2d} \text{ and } d_2 = \frac{r_2^2 - r_1^2 + d^2}{2d}$$

Area ($A_{int}$) represents an increased outlet flow area that is effectively realized by a disclosed compressor valve assembly.

For readers interested in an elegant derivation of the above equations, reference is made to article titled "The intersection Area of Two Circles" by Diego Assencio posted in the following URL https://diego.assencio.com/?index=8d6ca3d82151bad815f78addf9b5c1c6

In operation, disclosed embodiments implement a compressor valve assembly that cost-effectively and reliably incorporates the full benefits of the so-called bullet-style valve head design and effectively increase the flow area of the compressor valve assembly. Additionally, disclosed embodiments effectively permit guides that can individually be removably affixed to the stop plate and hence the disclosed design is conducive to user-friendly serviceability of individual guides while realizing an increased flow area with the full benefits of a bullet-style valve head.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A compressor valve assembly comprising:
a seat disposed at an inlet side of the compressor valve assembly, the seat comprising an inlet flow aperture;
a stop plate disposed at an outlet side of the compressor valve assembly, the stop plate in abutting relationship against the seat;
a guide removably affixed to the stop plate, the guide having a cylindrical cup portion and a cylindrical stem portion extending axially in a socket defined by a cylindrical wall in the stop plate, a base perimeter of the cylindrical cup portion being spaced apart relative to the bottom of the stop plate; and
a group of outlet flow apertures disposed in the stop plate and arranged about the cylindrical stem portion, a segment of respective cross sections of the group of outlet flow apertures spanned by the cylindrical cup and extending up to a point circumscribed by the outer surface of the cylindrical wall, wherein the guide further comprises a conical transition disposed between the base perimeter of the cylindrical cup and the cylindrical stem portion.

2. The compressor valve assembly of claim 1, wherein the conical transition defines a taper angle relative to the longitudinal axis of the guide.

3. The compressor valve assembly of claim 2, wherein the taper angle has a range from 25 degrees to 65 degrees.

4. The compressor valve assembly of claim 3, wherein the taper angle has a range from 30 degrees to 60 degrees.

5. The compressor valve assembly of claim 4, wherein the taper angle has a range from 35 degrees to 55 degrees.

6. The compressor valve assembly of claim 1, wherein an inner surface of the cylindrical wall has a thread configured to provide a threaded connection with a threaded mating surface of the cylindrical stem portion.

7. The compressor valve assembly of claim 1, further comprising a seal element and a spring disposed in the cylindrical cup portion of the guide, an inner surface of the cylindrical cup portion of the guide configured to guide travel of the seal element along the inner surface of the cylindrical cup portion so that a seal head of the seal element moves to close the inlet flow aperture when the spring is uncompressed and moves away from the inlet flow aperture when the spring is compressed during operation of the compressor valve assembly.

8. A compressor valve assembly comprising:
a seat disposed at an inlet side of the compressor valve assembly, the seat comprising an inlet flow aperture;
a stop plate disposed at an outlet side of the compressor valve assembly, the stop plate in abutting relationship against the seat;
a guide removably affixed to the stop plate, the guide having a cylindrical cup portion and a cylindrical stem portion extending axially in a socket defined by a cylindrical wall in the stop plate, a base perimeter of the cylindrical cup portion being spaced apart relative to the bottom of the stop plate; and
a group of outlet flow apertures disposed in the stop plate and arranged about the cylindrical stem portion, a segment of respective cross sections of the group of outlet flow apertures spanned by the cylindrical cup and extending up to a point circumscribed by the outer surface of the cylindrical wall, wherein each segment of the respective cross sections of the group of outlet flow apertures has an outlet flow area defined by a partial intersection of a circle having a radius formed by a respective outlet flow aperture and a circle having a radius ($r_1$) formed by the base perimeter of the cylindrical cup, wherein said circles have respective center points at a distance (d) from one another, wherein the radius ($r_2$) of the respective outlet flow aperture is smaller relative to the radius ($r_1$) of the base perimeter of the cylindrical cup.

9. The compressor valve assembly of claim 1, wherein the group of outlet flow apertures is formed by four outlet flow apertures arranged in a square centered about the longitudinal axis of the guide.

10. The compressor valve assembly of claim 8, wherein the area of the partial intersection is defined by the following:

$$A_{int} = r_1^2 \cos^{-1}\left(\frac{d_1}{r_1}\right) - d_1\sqrt{r_1^2 - d_1^2} + r_2^2 \cos^{-1}\left(\frac{d_2}{r_2}\right) - d_2\sqrt{r_2^2 - d_2^2}$$

where $$d_1 = \frac{r_1^2 - r_2^2 + d^2}{2d} \text{ and } d_2 = \frac{r_2^2 - r_1^2 + d^2}{2d}.$$

11. A compressor valve assembly comprising:
a guide removably affixed to a stop plate, the guide having a cylindrical cup portion and a cylindrical stem portion extending axially in a socket defined by a cylindrical wall in the stop plate, a base perimeter of the cylindrical cup portion being spaced apart relative to the bottom of the stop plate,
a group of outlet flow apertures disposed in the stop plate and arranged about the cylindrical stem portion, a segment of respective cross sections of the group of outlet flow apertures spanned by the cylindrical cup and extending up to a point circumscribed by the outer surface of the cylindrical wall,
wherein each segment of the respective cross sections of the group of outlet flow apertures has an outlet flow area defined by a partial intersection of a circle having a radius formed by a respective outlet flow aperture and a circle having a radius ($r_1$) formed by the base perimeter of the cylindrical cup, wherein said circles have respective center points at a distance (d) from one another, wherein the radius ($r_2$) of the respective outlet flow aperture is smaller relative to the radius ($r_1$) of the base perimeter of the cylindrical cup.

12. The compressor valve assembly of claim 11, wherein the area of the partial intersection is defined by the following:

$$A_{int} = r_1^2 \cos^{-1}\left(\frac{d_1}{r_1}\right) - d_1\sqrt{r_1^2 - d_1^2} + r_2^2 \cos^{-1}\left(\frac{d_2}{r_2}\right) - d_2\sqrt{r_2^2 - d_2^2}$$

where $$d_1 = \frac{r_1^2 - r_2^2 + d^2}{2d} \text{ and } d_2 = \frac{r_2^2 - r_1^2 + d^2}{2d}.$$

13. The compressor valve assembly of claim 11, wherein the guide further comprises a conical transition disposed between the base perimeter of the cylindrical cup and the cylindrical stem portion.

14. The compressor valve assembly of claim 13, wherein the conical portion defines a taper angle relative to the longitudinal axis of the guide wherein the taper angle has a range from 25 degrees to 65 degrees.

15. The compressor valve assembly of claim 14, wherein the taper angle has a range from 30 degrees to 60 degrees.

16. The compressor valve assembly of claim 15, wherein the taper angle has a range a range from 35 degrees to 55 degrees.

17. The compressor valve assembly of claim 11, wherein an inner surface of the cylindrical wall has a thread configured to provide a threaded connection with a threaded mating surface in the cylindrical stem portion.

18. The compressor valve assembly of claim 11, further comprising a seal element and a spring disposed in the cylindrical cup portion of the guide, an inner surface of the cylindrical cup portion of the guide configured to guide travel of the seal element along the inner surface of the cylindrical cup portion so that a seal head of the seal element moves to close the inlet flow aperture when the spring is uncompressed and moves away from the inlet flow aperture when the spring is compressed during operation of the compressor valve assembly.

19. The compressor valve assembly of claim 11, wherein the group of outlet flow apertures is formed by four outlet flow apertures arranged in a square centered about the longitudinal axis of the guide.

\* \* \* \* \*